(12) United States Patent
Eckert et al.

(10) Patent No.: US 12,220,689 B2
(45) Date of Patent: Feb. 11, 2025

(54) PROCESS FOR PRODUCING CATALYSTS FOR AMMONIA SYNTHESIS BY REDUCING IRON OXIDES

(71) Applicant: Clariant International Ltd, Muttenz (CH)

(72) Inventors: Rene Eckert, Bad Aibling (DE); Stephan J. Reitmeier, Kirchseeon (DE); Stefan Maier, Grafing (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 457 days.

(21) Appl. No.: 17/625,819

(22) PCT Filed: Jul. 8, 2020

(86) PCT No.: PCT/EP2020/069218
§ 371 (c)(1),
(2) Date: Jan. 10, 2022

(87) PCT Pub. No.: WO2021/013544
PCT Pub. Date: Jan. 28, 2021

(65) Prior Publication Data
US 2022/0250048 A1 Aug. 11, 2022

(30) Foreign Application Priority Data
Jul. 24, 2019 (DE) .................. 10 2019 120 012.1

(51) Int. Cl.
*B01J 37/18* (2006.01)
*B01J 23/745* (2006.01)
(Continued)

(52) U.S. Cl.
CPC ............ *B01J 37/18* (2013.01); *B01J 23/745* (2013.01); *B01J 37/08* (2013.01); *C01C 1/0411* (2013.01); *G01N 21/75* (2013.01)

(58) Field of Classification Search
CPC .......... B01J 37/18; B01J 23/745; B01J 37/08; G01N 21/75; C01C 1/0411
(Continued)

(56) References Cited

U.S. PATENT DOCUMENTS

| 4,703,030 A | * | 10/1987 | Khader | ................. B01J 23/745 423/362 |
| 5,093,303 A | * | 3/1992 | Tamaura | ............... B01J 23/745 423/632 |

(Continued)

FOREIGN PATENT DOCUMENTS

| CH | 681392 | 3/1993 |
| CN | 1114239 | 1/1996 |

(Continued)

OTHER PUBLICATIONS

A, Baranski et al., "Kinetics of Reduction of an Iron Catalyst for Ammonia Synthesis." Reaction Kinetics and Catalysis Letters, vol. 15, No. 2, pp. 285-291. (Year: 1980).*

(Continued)

*Primary Examiner* — Patricia L. Hailey

(57) ABSTRACT

Disclosed is a process whereby completed catalysts can be produced from the iron oxides, and these catalysts can be activated and employed directly after activation for ammonia synthesis from synthesis gas, comprising for example a mixture of nitrogen and hydrogen. A process is also disclosed to produce pre-reduced catalyst precursors, which are first reduced under controlled conditions and subsequently passivated in an oxidizing atmosphere, before they are used in ammonia synthesis as catalysts. These pre-reduced catalysts can be activated significantly more quickly and under milder conditions than the iron oxides.

20 Claims, 6 Drawing Sheets

(51) Int. Cl.
*B01J 37/08* (2006.01)
*C01C 1/04* (2006.01)
*G01N 21/75* (2006.01)

(58) Field of Classification Search
USPC .................. 502/53, 56, 338; 436/39, 50, 55
See application file for complete search history.

(56) References Cited

U.S. PATENT DOCUMENTS

| | | | |
|---|---|---|---|
| 7,091,043 | B2 | 8/2006 | Itou |
| 10,287,173 | B2 | 5/2019 | Malmali |
| 11,054,406 | B2 | 7/2021 | Virtanen |

FOREIGN PATENT DOCUMENTS

| | | |
|---|---|---|
| CN | 105435861 | 3/2016 |
| RU | 2263538 | 11/2005 |
| SU | 1077624 | 9/1985 |

OTHER PUBLICATIONS

English translation of the Written Opinion for PCT/EP2020/069218. (Year: 2020).*

600Kt/a Ammonia Synthesis Unit, Ammonia Synthesis Catalyst Reduction Summary, M-Sized Nitrogenous Fertilizer Process,, 2018, p. 46-49, 2018., No. 2.

Selection and Reduction of New Type of Ammonia Synthesis Catalyst, Fertilizer Industry,, 2007, No. 4, p. 7-11, 2007., 34.

Shu Jizhao, The Reduction Rate of A110-2 Ammonia Catalyst, Journal of Zhejiang Institute of Technology, 1989, p. 41-47, 03.

W.C. Lin et al, Determination of Water Vapor in a Small air sample by a Nondispersive Infrared Gas Analyzer, 1997, p. 278-281, 32, No. 2.

A. Baranski et al., Applied Catalysis 40 (1988), 67-72 "Simultaneous effect of phase composition and water vapour on the reduction of iron catalyst for ammonia synthesis".

A. Baranski et al., Applied Catalysis 3 (1982) 201-206 "The effect of water on the reduction of an iron catalyst for ammonia synthesis".

Chen, Z., Lu, C., Sensor Letters 3 (2005) 274-295 "Humidity Sensors: A Review of Materials and Mechanisms".

Nakatani S, (2003) SAE Technical Papers, "Development of a gaseous compounds measurements system for fuel cell powertrain" SAE World Congress, Mar. 3-6, 2003 SAE International.

Stohlberg-Rohr, T. et al., NDIR humidity measurement, 2011, 1058-1061.

Turner, K., Schaffer, C., "Ammonia Synthesis Loop Water Exposure: Identification and Re-reduction of AmoMax®-10" Ammonia Technical Manual, 2016, 119-122.

\* cited by examiner

PROCESS FOR PRODUCING CATALYSTS FOR AMMONIA SYNTHESIS BY REDUCING IRON OXIDES

In the production of catalysts and/or catalyst precursors on the basis of iron oxides for ammonia synthesis, the iron oxides are generally reduced in reactors, using reducing gases. This procedure is accompanied by formation of a highly catalytically active form of elemental iron, more particularly a form of an alpha-iron with cubic space-centering. Reduced iron catalysts of this kind can be used to particularly good effect as catalysts for ammonia synthesis, more particularly for the Haber-Bosch synthesis.

During the reduction of the iron oxides, water is formed, but may act as a catalyst poison. In order, therefore, to limit the amount of the water formed during the reduction, the reduction procedure is frequently carried out very slowly and cautiously. Moreover, the concentration of the water formed is ascertained at regular intervals by the Ascarite method. In the case of this analysis, the water content is ascertained by the passage of a defined amount of sample gas through an adsorbent, with only the water in the sample gas being adsorbed on the adsorbent. Thereafter the difference in weight of the absorbent is ascertained and, with the measured volume flow rate, the amount of water is calculated. A method of this kind is very time-consuming and furnishes information about the water content of the sample only subject to a certain delay.

It is an object of the present invention to provide a process for activating catalysts and catalyst precursors for ammonia synthesis that is improved in relation to the disadvantages stated above. Also described is the use of an NDIR detector for ascertaining the concentration of the water during the reduction of iron oxides.

A subject of the present invention is a process for activating catalysts and catalyst precursors for ammonia synthesis, comprising the process steps of:
(A) iron oxides are reduced for activating the catalysts, using at least one reducing gas and by means of heating,
(B) the concentration of the water formed during the reduction in the gas phase is measured by means of non-dispersive infrared spectroscopy (NDIR), and
(C) the flow rate of the reducing gas and/or the heating rate are set as a function of the concentration of the water formed.

Non-dispersive infrared spectroscopy (NDIR) involves spectrometric analysis of gases for measurement, with infrared radiation of a defined wavelength being irradiated into a sample. The IR beam is attenuated by absorption as a function of the concentration of the gas in the beam path. This gives rise, in the interior of an optopneumatic receiver, an NDIR sensor, to pressure differences, which can be converted into electrical voltage by micro flow sensors and provide information concerning the amount of the absorbing gas molecules in the sample. Regarding the construction of the NDIR sensors, which are known to the skilled person, reference is made to the handbook "*XStream Gas Analyzers, XStream X2 Series*" from Emerson Process Management GmbH & Co. OHG, Mai 2017 edition, sections 3.1.2 and 3.1.3.

In this case the ascertainment of the concentration of the water by means of NDIR is possible directly and, in contrast to the conventional processes, does not require costly and inconvenient analyses, meaning that the flow rate of the reducing gas and/or the heating rate can be set particularly simply as a function of the concentration of the water in the exit gas from the reactor, thereby making it possible to diminish the development, during the reduction, of water concentrations that are detrimental to the catalyst.

By means of the process of the invention, completed catalysts can be produced from the iron oxides, and these catalysts can be activated and employed directly after activation for ammonia synthesis from synthesis gas, comprising for example a mixture of nitrogen and hydrogen. It is also possible by means of the process of the invention to produce pre-reduced catalyst precursors, which are first reduced under controlled conditions and subsequently passivated in an oxidizing atmosphere, before they are used in ammonia synthesis as catalysts. These pre-reduced catalysts can be activated significantly more quickly and under milder conditions than the iron oxides.

Moreover, in process step (C), the concentration of the water determined in process step (B) can be compared with a mandated limiting value for water. This may be carried out, for example, by defining a range around the limiting value and setting the flow rate of the reducing gas and/or the heating rate as a function of the measured water concentration in such a way that the concentration of water varies within the mandated range around the limiting value. At the start of the process in particular, the water concentration may fluctuate around the range around the limiting value and may therefore also be located outside this range. Especially if the process is not yet running stably, the water concentration may exceed the range around the limiting value by 200 ppmv (parts per million by volume) for a maximum of 1 h or by 400 ppmv for a maximum of 20 min. As soon as the process is running stably, the water concentration will vary primarily within the range around the limiting value.

In another embodiment of the process of the invention, in process step (C) at least one of the following substeps is carried out:
(C1) the heating rate is increased if the concentration of water determined in process step (B) is below a range around the mandated limiting value, or
(C2) the flow rate is increased and/or the heating rate is lowered if the concentration of water determined in process step (B) is above a range around the mandated limiting value, or
(C3) the flow rate and/or the heating rate are retained if the concentration of water determined in process step (B) is within a range around the mandated limiting value.

The inventors of the present invention have recognized that the concentration of the water formed during reduction of the iron oxides in the gas phase is not to exceed, advantageously, a limiting value of 4000 ppmv, preferably of 3400 ppmv, more preferably of 3200 ppmv, still more preferably of 3000 ppmv. Reduced iron catalysts which have been activated at higher concentrations of water in the gas phase generally display lower activities in the subsequent ammonia synthesis. Activating the iron oxides with a relatively high fraction of water in the gas phase therefore leads to catalysts which exhibit lower activity in the subsequent ammonia synthesis; at the same time, however, a higher fraction of water enables more rapid and therefore more economical activation of the catalysts. The range around the limiting value is more particularly selected from a group of ranges consisting of: ±1000 ppmv, ±800 ppmv, ±600 ppmv, ±400 ppmv, ±300 ppmv and ±200 ppmv. The range is preferably ±300 ppmv, more preferably ±200 ppmv. A limiting value of 3000 ppmv and a range of ±600 ppmv are possible. A limiting value of 3000 ppmv and a range of ±200 ppmv are particularly preferred.

In the case of low temperatures in the reactor plant, the heating rate can be very large and especially at the start of the reduction can be up to 40 K/h. Conversely, during the reduction of the iron oxides, provided the concentration of water is within the desired range, the heating rate may be in the range from 0 K/h to 2 K/h. The durations with these low heating rates may be up to 48 h, depending on the flow rate and on the catalyst volume.

According to one advantageous embodiment of the process of the invention, it can be implemented as a continuous process, wherein process steps (A), (B) and (C) are carried out continuously. Accordingly it is possible in particular, during the reduction of the iron oxides in process step (A), to ascertain the concentration of the water formed during the reduction at the same time in the process step (B) by means of NDIR and to adapt the flow rate of the reducing gas and/or the heating rate accordingly within a short duration in process step (C). It is possible accordingly, advantageously, to carry out all of process steps (A) to (C) in parallel alongside one another, or simultaneously, and this represents a considerable time advantage relative to the conventional process, in which it is necessary first to await the results of the Ascarite method. Hence the concentration of the water can be measured continuously in process step (B) by means of NDIR (two measurement values per second), whereas the Ascarite method provides in general a measurement value only every 1 to 2 h. Moreover, depending on the water concentration ascertained in process step (B), the substeps (C1), (C2) or (C3) may be performed one after another repeatedly as and when required.

In the case of a further variant of the process of the invention, the measurement of the water formed during the reduction in process step (B) takes place in real time. This allows an immediate response to changes in the concentration of the water formed, and permits corresponding adaptation of the flow rate and/or the heating rate. With this variant of the process of the invention, it is possible to respond to a change in the amount of the water formed, in particular, within a period of 1 to 10 min. Depending on the heating rate, the water concentration may rise to values of up to 3000 ppmv in a period of 0.5 h to 2 h. Generally speaking, the water concentration in process step (B) is measured continuously by means of NDIR and checked every 15 min, and the heating rate and/or the flow rate of the reducing gas are adapted correspondingly in process step (C) as a function of the measured water concentration.

Advantageously, in a process of the invention, in process step (A), a mixture comprising hydrogen and nitrogen is used as reducing gas, in which case ammonia may be formed as early as during the reduction of the catalysts, owing to a partial activation of the catalysts. In such a variant of the process of the invention, the activation of the catalysts during the process may also be ascertained by the rising level of ammonia formed in the gas phase. If the process of the invention is carried out in a reactor which is also employed for the ammonia synthesis, it is particularly simple to commence the ammonia synthesis immediately when the activation of the catalysts is at an end. The reducing gas may in addition also comprise noble gases, such as argon, for example. In particular, all of the nobles gases present in the air may be present in the reducing gas. Additionally, methane may be present in the reducing gas as well, this methane having not been converted during the reforming, the formation of hydrogen from methane.

In the case of a further advantageous variant of the process of the invention, the concentration of the water formed during the reduction is measured in process step (B) in a wavelength range from 2.6 µm to 3 µm, preferably in the range from 2.7 to 2.8 µm, more preferably in the range from 2.75 µm to 2.79 µm. The concentration of water is measured typically at wavelengths of about 6 µm, although in this wavelength range the interference with absorption bands of the ammonia is particularly great. In order to reduce this overlap, therefore, measurement takes place preferably in the above-specified wavelength range from 2.6 µm to 3 µm.

With particular advantage, the water formed is measured in process step (B) using an NDIR device, with the absorption bands of ammonia being subtracted out by means of calibration in the wavelength range from 2.6 µm to 3 µm, more preferably in the range from 2.75 µm to 2.79 µm. For example, calibration curves may be constructed by means of experimental data involving NDIR measurement of gas samples containing about 0 volume % to 20 volume % ammonia. These calibration curves enable a determination of the background signal of ammonia in the above-specified wavelength range as a function of the concentration of ammonia, and enable this concentration to be taken into account correspondingly in the analysis of the water in this wavelength range. The inventors of the present process have found that during the reduction of iron oxides with a mixture of hydrogen and nitrogen, ammonia may be formed in amounts from 0 volume % to 20 volume %, with the fraction of ammonia in the gas phase increasing as the reduction progresses.

With particular advantage it is possible in process step (B) additionally to ascertain the concentration of the ammonia formed in the course of the reduction, by means of NDIR. Ascertainment of the ammonia which may likewise be formed in the course of the reduction when nitrogen is present in the gas phase can, with particular advantage, provide information on the course of the activation of the catalysts or catalyst precursors. Ascertaining the concentration of formed ammonia in the gas phase here may be done with particular simplicity in a similar way as for the ascertainment of the water in the gas phase, by means of NDIR, so permitting particularly rapid ascertainment of the values. In particular it is possible to determine ammonia simultaneously in a sample together with water by means of NDIR, with the concentration of the ammonia being ascertained advantageously in a wavelength range from 10.8 µm to 11.2 µm, preferably at 11 µm. Water does not absorb any IR radiation in this range, and so the concentration of ammonia can be ascertained with particular simplicity, with no need to correct the values.

In a further advantageous variant of the process of the invention, the reduction is carried out in process step (A) in a reactor which possesses feed conduits for feeding the reducing gas and takeoff conduits for taking off a gaseous reaction mixture from the reduction, the components of this mixture including the water formed in the reduction, and any ammonia formed. The takeoff conduits have a sampling line at the reactor exit for the taking of a sample for the NDIR measurement. The sampling line is advantageously thermally insulated and possibly also has an additional heating apparatus which ensures that the temperature in the sampling line does not drop too sharply. A temperature drop results in water condensing, which would distort the measurement results obtained by NDIR. If the sample to be measured is taken directly at the reactor exit, the part played by heat losses in the reactor exit line is not yet very great. In process step (B), in the case of such a variant of the process of the invention, a sample of the gas phase for analysis can be taken particularly simply by way of the sampling line, and the concentration of water and/or the concentration of ammonia can be ascertained with particular reliability by means of NDIR.

In particular, a sample for analysis can be expanded to a pressure of about 0.01 to 2 barg (0.01 to 2 bar above atmospheric pressure) and then the water content and/or ammonia content can be ascertained by means of NDIR. The dew point of the sampled gas reduces under these conditions from about 70° C. to 80° C. before the expansion to 0° C. to 10° C., preferably to about 10° C., after the expansion, with the temperature in the NDIR device being generally 40° C. to 50° C. The maximum permissible temperature for the gas mixture for measurement is 60° C., and the minimum temperature can be just above the dew point. Additionally, the sampled gas stream for analysis can be also be filtered in order to prevent fouling of the NDIR detector. The flow rate set during the measurement is advantageously always the same, in order for more reproducible measurement results to be obtained. The flow rate during the NDIR measurement may be in particular in the range from 0.2 l/min to 1.5 l/min, preferably at 1.5 l/min.

In a further variant of the process of the invention, ammonia and/or water formed in the course of the reduction are taken off from the reactor in process step (C) and condensed by means of a condenser. This provides a particularly simple way of removing water and any ammonia formed from the reduction operation and hence of preventing cumulation of water during the reduction operation.

In process step (C), additionally, the temperature of the condenser can be set such that it is at least 10 K, preferably at least 5 K, over the freezing point of the aqueous ammonia solution. With a process of this kind, it is possible on the one hand to set the temperature of the condenser so as to prevent disadvantageous freezing of the condenser; on the other hand, nevertheless, the temperature of the condenser is lowered to an extent such that reliable condensation of water and/or ammonia, or of an aqueous ammonia solution, is readily possible. On the basis of the NDIR measurements of water and/or ammonia, which are particularly simple and quick to perform, the process parameters for the reduction, such as the pressure, the temperature and the flow rate, for example, can be adapted to the respective measured concentrations of water and/or ammonia in the gas phase, in order to enable reliable condensation.

With particular simplicity the at least one reducing gas, comprising a mixture of nitrogen and hydrogen, for example, can be returned to the reduction operation after water and/or ammonia have been separated off. Given that not the entire reducing gas is consumed during the reduction operation, a variant of the process of the invention of this kind is particularly economical.

For the process of the invention, it is possible in process step (A) to use a reactor plant which comprises a reactor for the reduction of the iron oxides, this reactor having feed conduits for feeding the reducing gas and takeoff conduits for taking off a gaseous reaction mixture from the reduction. The reactor plant may in particular have a gas circuit in which gaseous reaction mixture taken off from the reactor is returned via the feed conduits, following removal of water and/or ammonia, to the reduction operation. A reactor system of this kind may be, in particular, a reactor for ammonia synthesis wherein the catalyst is obtained from catalyst precursors by means of activation by reduction prior to commissioning. Alternatively, the reactor plant may also be a reactor which has been designed for the reduction of the catalysts and from which, after the completed reduction and any passivation of the catalyst precursors, they can be removed and transported off.

Iron oxides used in process step (A), in a further embodiment of the process of the invention, may be more particularly magnetite or wüstite or a combination thereof, preferably wüstite. Magnetite is a mixed iron oxide having the general chemical composition $Fe_3O_4$, and comprises divalent and trivalent iron. Waste, in contrast, is iron(II) oxide FeO, which may also have a nonstoichiometric composition $Fe_{1-x}O$.

In process step (A), the temperature during the reduction may be set to a range from 360° C. to 450° C., preferably a range from 370° C. to 400° C. (for wüstite). At these temperatures, iron oxides—wüstite or magnetite for example—can be reduced with particular reliability.

The inventors have found that the reduction of wüstite proceeds even at relatively low temperatures of about 370° C. to 400° C. Water is released during the reduction. Conversely, for the reduction of magnetite with release of water, temperatures of over 400° C. are required, in particular in the range from 420° C. to 460° C. In the case of the reduction of wüstite, therefore, effective control of the process via the heating rate and/or the flow rate is particularly advantageous in order to prevent an excessive increase in the concentration of water in the gas phase even at relatively low temperatures.

In process step (C) the flow rate ("gas hourly space velocity; ghsV") may be set in particular at values from 1000 $h^{-1}$ to 70000 $h^{-1}$, preferably from 3000 $h^{-1}$ to 60000 $h^{-1}$. The pressures in process step (A) may be set at values from 60 bar to 600 bar, preferably 60 bar to 300 bar, more preferably 60 bar to 180 bar, more preferably still 80 bar to 150 bar. At the start the pressures are about 80 bar, whereas with progressive reduction pressures of up to 600 bar, preferably up to 300 bar, are possible.

In process step (A), in particular, the reduction may be carried out in a system which has a heating apparatus for heating the at least one reducing gas. This heating apparatus may be present either in the reactor, or may be located outside the reactor, as shown in FIG. 1. The heating device, for example, may also be a heat exchanger, in which heat from the reactor space is transmitted to the reducing gas to be newly introduced. A heating apparatus is necessary especially at the start of the process of the invention, in order to attain the temperatures needed for the reduction. As the process of the invention progresses it is possible in process step (A) for the heating apparatus component of the overall heat balance to drop and for the component comprising the heat of reaction from the formation of ammonia to rise, with the consequence that the flow rate can be raised.

In a further embodiment of the process of the invention, in a process step (D), the catalysts and/or catalyst precursors from process step (C) are exposed to an oxidizing gas for forming a protective layer on the catalysts and/or catalyst precursors. The oxidizing gas used may be, in particular, a gas mixture comprising oxygen, or air. In this case it is particularly advantageous if, after the end of the reduction, the composition of the gas is changed and, for example, an oxidizing gas comprising nitrogen and air is supplied, so that a passivation layer is formed on the reduced catalysts by means of oxidation. Prior to the commissioning of a reactor for ammonia synthesis, these catalyst precursors can be subjected particularly easily to a short reduction step and used subsequently as catalysts for the ammonia synthesis.

Another subject of the present invention is the use of an NDIR detector for ascertaining concentration of the water which forms during the reduction of iron oxides in the activation of catalysts and catalyst precursors for ammonia synthesis.

In the case of such a use, it is possible in particular for the concentration of the water to be ascertained in real time. The reduction can be accomplished by means of a reducing gas, and the flow rate and/or the heating rate of the reducing gas can be set as a function of the concentration of the water formed.

Incidentally, all embodiments already stated above in relation to the process for activating the catalysts may also be realized in the context of the use of an NDIR detector.

The intention of the text below is to illustrate the invention, using working examples and figures, in which.

Figure 1:
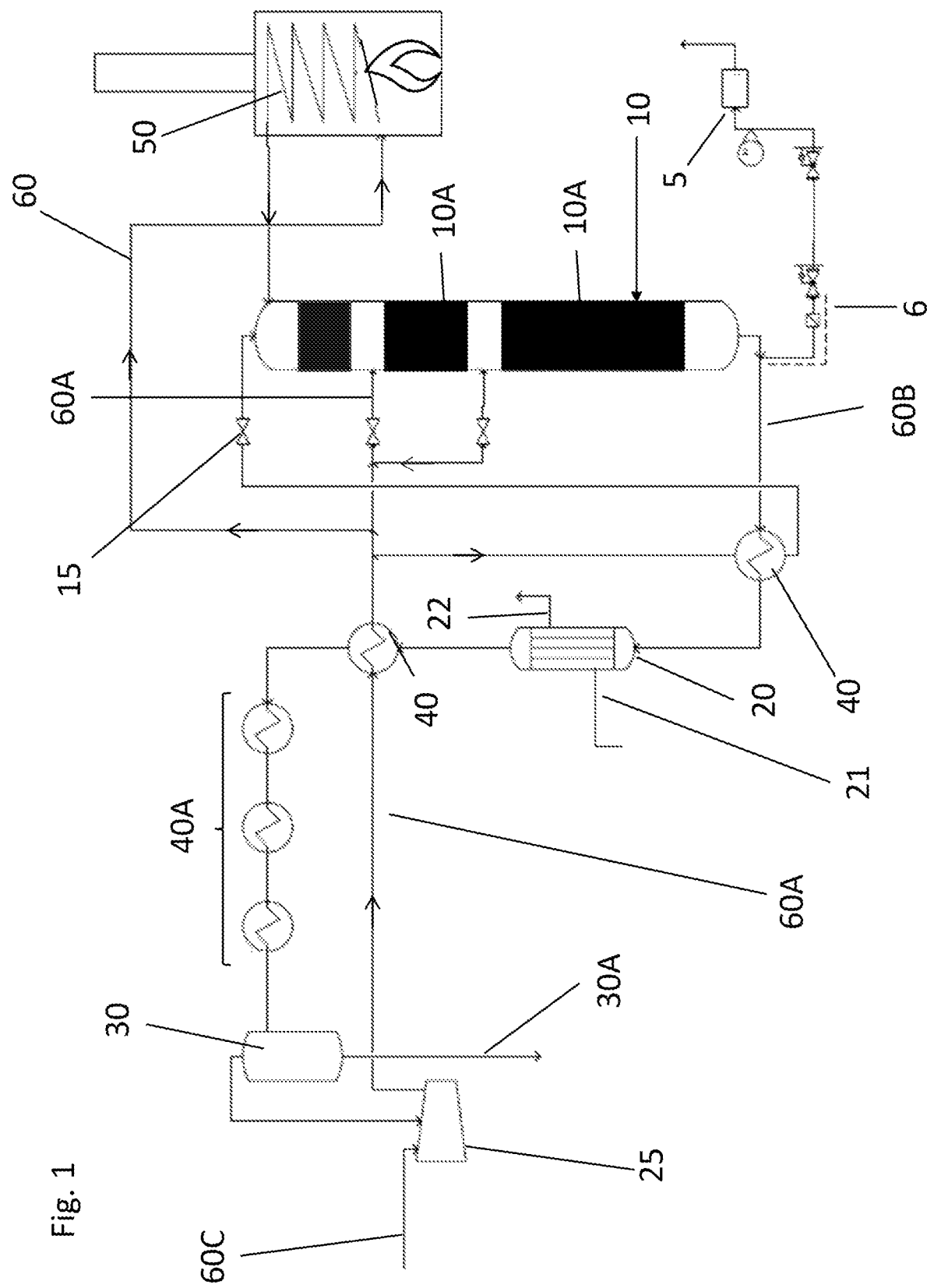
FIG. 1 shows a reactor system for implementing a process of the invention.

FIG. 1 shows schematically a reactor plant for implementing a process of the invention. A reactor 10 is present, and comprises various catalyst beds 10A. The iron oxides for reduction are located in the catalyst beds 10A. The reactor 10 possesses a pipe system 60 with feed conduits 60A, via which the at least one reducing gas is introduced into the reactor, and possesses takeoff conduits 60B, via which the gaseous reaction mixture from the reduction is taken off from the reactor, allowing the gas to circulate in the reactor plant. The direction of the arrows here indicates the direction in which the gases circulate in the reactor plant. During the reduction of the iron oxides, the at least one reducing gas can be heated by means of a heating apparatus 50. Also present is a NDIR sensor 5, which is able to measure the water content and/or the ammonia content of the reaction gases from the reduction operation at the takeoff conduit 60B. Present for this purpose on the takeoff conduit 60B is an insulated and heatable conduit 6. The conduit 6 here may have thermal insulation and/or a heating apparatus, which may serve to keep the temperature of the gas mixture for analysis high enough to prevent the water condensing and hence the result of the NDIR measurement being distorted. The pressure in the takeoff conduit 6 is reduced in stages to 1 to 2 barg and then to 0.01 to 0.5 barg for the NDIR measurement.

The text below illustrates the course of one embodiment of the process of the invention in this reactor plant.

Via a gas feed line 60C, the at least one reducing gas, which preferably comprises hydrogen and nitrogen, can be compressed by means of a compressor 25 and then introduced into the interior of the reactor 10 via a feed conduit 60A. At the start of the process, the gas mixture can be brought to the requisite temperature—for example, up to 450° C., preferably to 370° C. to 390° C.—via the heating apparatus 50, and then passed through the catalyst beds 10A. Control valves 15 are present throughout the system in order to set the gas flow. The further downstream the siting of the catalyst beds 10A in the reactor 10, the greater the size of the catalyst beds. During the reduction, the gas mixture resulting from the reduction, which comprises water and/or ammonia and also unreacted hydrogen and nitrogen, is taken from the reactor via the takeoff conduit 60B. The water and/or ammonia content of this gas mixture is then determined by means of the NDIR sensor 5, which is connected to the takeoff conduit 60B via a conduit 6 at the reactor exit. The gas mixture resulting from the reduction can give up at least part of the heat still present subsequently, by way of a heat exchanger 40. The gas mixture is then passed into a heat recovery boiler 20, in which it gives up further heat to water which is passed through the heat recovery boiler. This water is introduced into the heat recovery boiler 20 by means of a connection 21 and is taken off in the form of steam from the heat recovery boiler via the connection 22. The steam may be used, for example, for boosting the energy efficiency and thermal efficiency of the overall plant, for operating the compressors by means of steam turbines. Thereafter the gas mixture can give up further heat, via further heat exchangers 40 and/or via ammonia condensers 40A, and so subsequently in the separator 30 there can be separation of a mixture of ammonia and/or water. The water/ammonia mixture separated off may then be removed from the system via the takeoff line 30 A. The reducing gas mixture comprising hydrogen and nitrogen may then be returned to the compressor 25, for use in a further cycle for the reduction of the iron oxides.

The flow rate of the reducing gas and/or the heating rate may be set accordingly as a function of the concentrations of water and/or ammonia in the system that are determined by the NDIR sensor 5; accordingly, during the reduction, the concentration of the water formed varies within a range around a certain limiting value. The NDIR sensor 5 may additionally be used to set the temperature in the separator 30 so that there is no freezing of ammonia, which would be detrimental to the operation of the separator.

Figure 2:
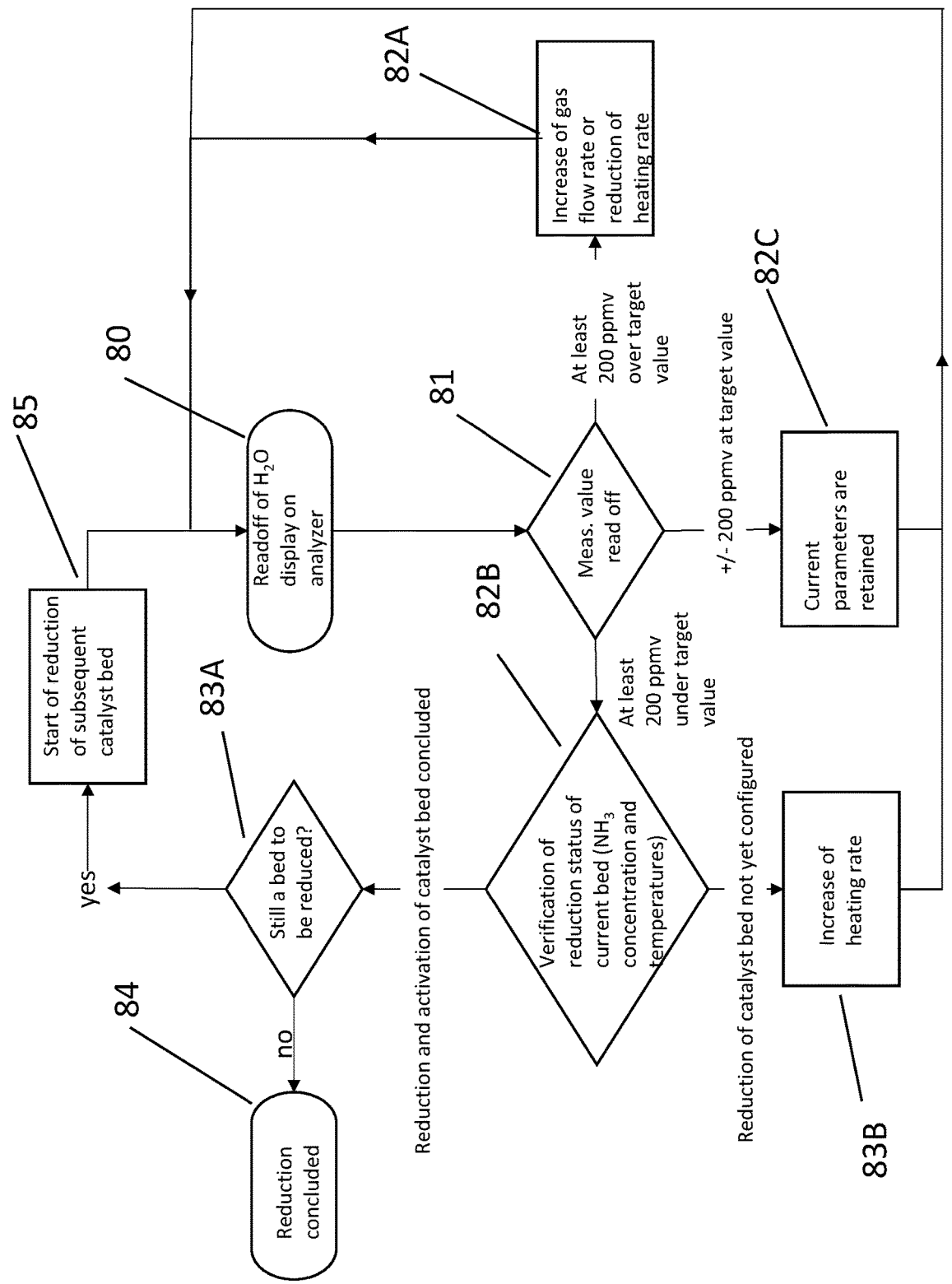
FIGS. 2 and 3 show flow schemes for the ascertainment of water and ammonia by means of NDIR, and the subsequent process steps for controlling the process.

FIG. 2 shows a flow scheme for the procedures and substeps which take place after the determination of water using an NDIR sensor. In this embodiment, the limiting value for the concentration of water in the gas phase may be, for example, 3000 ppmv, and the range around the limiting value may be ±200 ppmv. Beginning with the elements carrying reference 80, 81, the water content determined by means of NDIR is first read off on the analyzer of the reactor plant, and the value is compared with the limiting value. Depending on the outcome of the comparison, there are then three different substeps (C1), (C2) or (C3). If it is found that the measured value is more than 200 ppmv over the limiting value, in a process step (C2) the flow rate is increased and/or the heating rate is lowered (82A). Accordingly, the concentration of the water formed can either be reduced in the gas phase by the setting of a higher flow rate, leading to more rapid dilution of the water concentration in the gas phase, or the reduction is reduced by lowering of the heating rate. If it is found that the measured value is more than 200 ppmv below the limiting value, then the reduction status in the catalyst bed of the reactor is checked (82B), this being possible, for example, via the ascertainment of the temperature of the catalyst bed or, if the reducing gas comprises nitrogen and hydrogen, this is accomplished via the ammonia concentration in the gas phase. For the temperature measurement there may be temperature sensors at the entry and exit of the catalyst beds. The reduction of a catalyst bed may be considered to be complete when there is no further increase in the ammonia concentration at constant pressure and temperature. If it is found that the reduction in the catalyst bed is not yet at an end, the heating rate can then be increased (83B) in process step (C1). Should it be found that the concentration of water in the gas phase is within a range of ±200 ppmv around the limiting value, then the flow rate and/or the heating rate can be retained (82C) in a substep (C3).

Should it be found that the reduction of the iron oxides in a catalyst bed has already been completed, verification may be carried out as to whether there are still catalyst beds in the reactor with iron oxides requiring reduction (83A). If this is not the case, the reduction is at an end (84) or, if there are further catalyst beds, the entry temperature of the subsequent bed can be increased by the closing of a valve in order for the reduction of the next catalyst bed to commence (85). The heating rate can be set by adjustment of the control valve.

Figure 3:
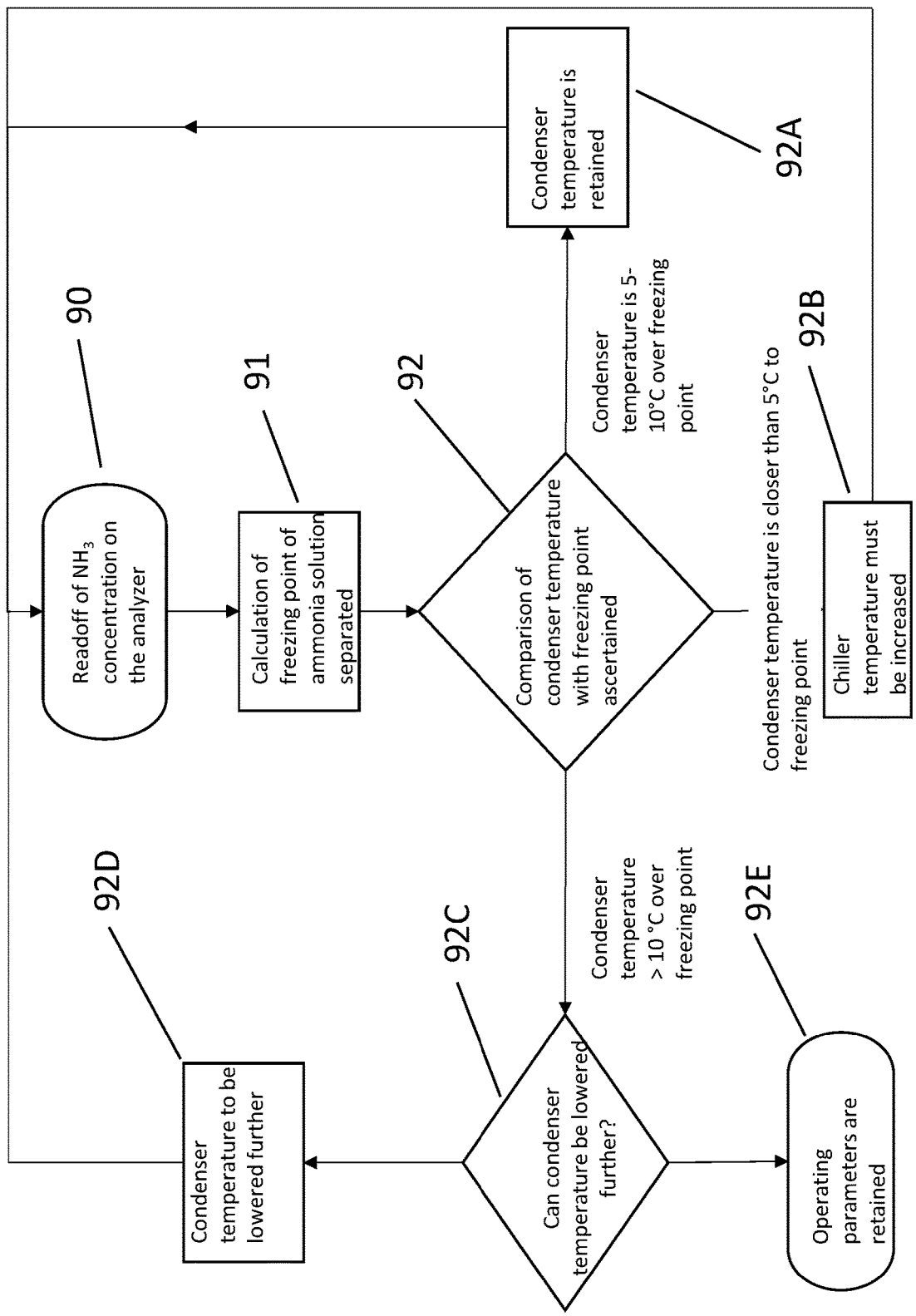

FIG. 3 shows, in a flow scheme, the procedures and substeps which arise after the determination of the ammonia. For these purposes, in a first step (90), the concentration of ammonia in the gas phase is ascertained and then the respective freezing point of the aqueous ammonia solution is calculated (91) as a function of the process parameters, such as pressure, water content in the gas phase and temperature. The temperature of the condensing apparatus is then compared with the calculated freezing point of the aqueous ammonia solution (92) and different substeps are performed depending on the outcome. The process substeps may be, in particular, a process step (C4), in which the temperature of the condensing apparatus is increased if the temperature of the condensing apparatus is less than 5 K over the calculated freezing point of the aqueous ammonia solution (92B). A further possibility is for the temperature of the condensing apparatus to be lowered further in a process step (C5) if the condenser temperature is more than 10 K above the calculated freezing point of the aqueous ammonia solution. A determination is first made here as to whether the plant allows the temperature of the condenser to be lowered further (92C). Many plants do not allow any further drop in the condenser temperature, particularly if the condenser temperature is already −20° C. Depending on whether a further lowering is possible, then either the condenser temperature is lowered further (92D) or the operating parameters are retained (92E). A process of this kind represented in FIG. 3 with the corresponding substeps makes it possible for water and/or ammonia to be condensed from the gas phase in a particularly reliable way, and at the same time prevents freezing of the condensing apparatus. If the condenser temperature is in a range from 5 to 10° C. above the freezing point of the aqueous ammonia solution, the condenser temperature can be retained (92A).

Figure 4:
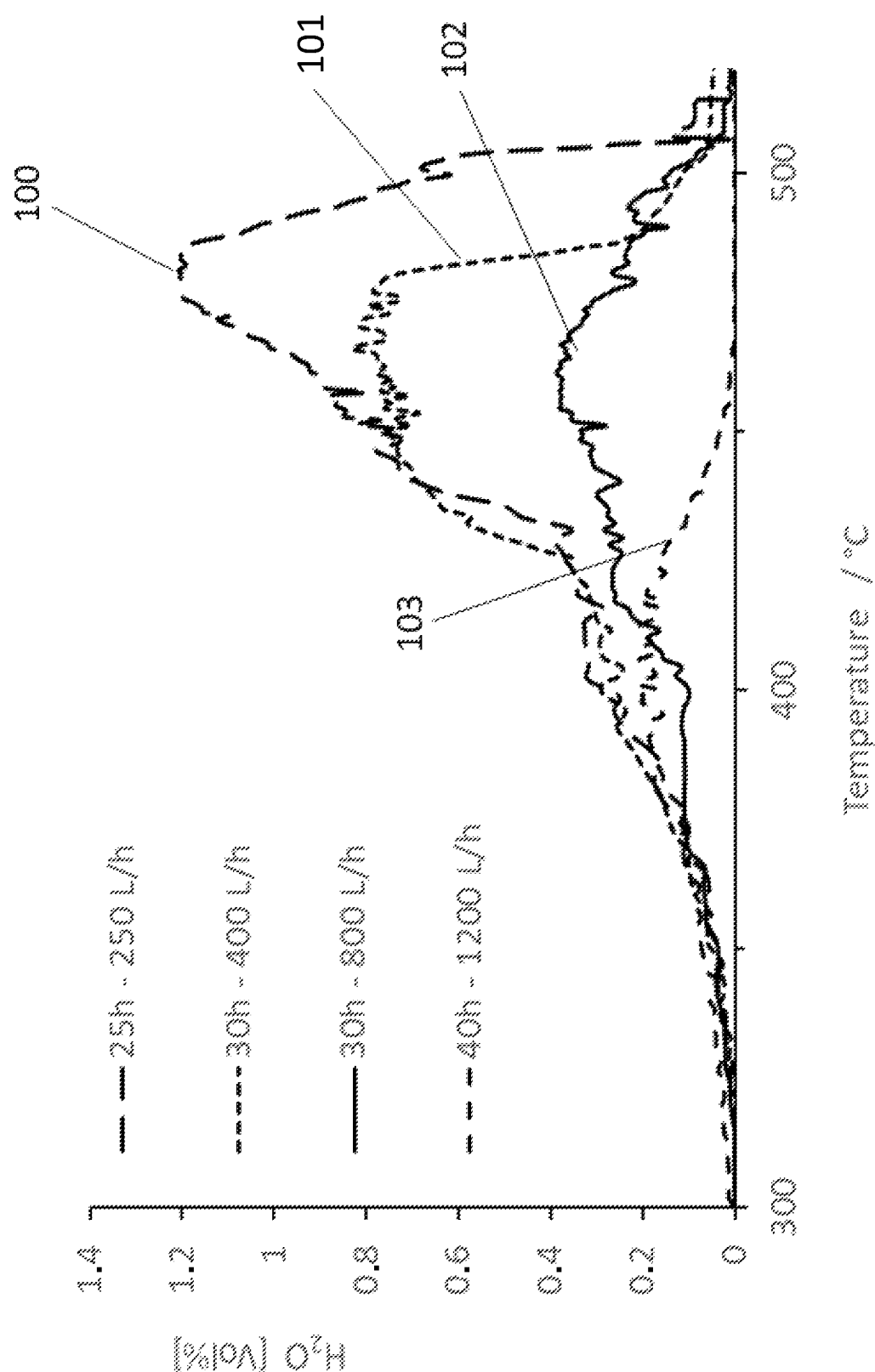
FIGS. 4 and 5 show the effects of the water content on the catalytic activity in the reduction of the iron oxides.

FIG. 4 shows, in a diagram, the experimentally determined temperature profile and the experimentally determined water content in volume % in the gas phase for a reduction of iron oxides with a synthesis gas containing 76.5% hydrogen, 22.5% nitrogen and 10% argon (volume % in each case). The iron oxides were reduced for different times at different flow rates of the synthesis gas, with a reduction in the water content in the gas phase being possible through an increase in the flow rate. The curve denoted 100 shows here the course of the water content as a function of the temperature for reduction over 25 hours with a flow rate of 250 l/h. The curve denoted 101 shows the course of the water concentration in the gas phase for a 30-hour reduction with a flow rate of 400 l/h. The course of the water concentration for a 30-hour reduction with a flow rate of 400 l/h is identified by the curve denoted 102. A further reduction over a period of 40 hours with a flow rate of 1200 l/h was likewise carried out (curve denoted 103). It is clearly apparent that the concentration of the water decreases with increasing flow rate, owing to the dilution effect of newly arriving gas, but on the other hand the time which is needed for the reduction goes up. FIG. 4 also shows that as a result of the increase in the flow rate, the maximum concentration of the water formed can be lowered successively from very high values of about 12000 ppmv at a flow rate of 250 l/h, so that lastly, at a flow rate of 1200 l/h, concentrations of water formed of under 1500 ppmv are attained, which are no longer detrimental to the catalytic activity of the catalysts or catalyst precursors formed.

Figure 5:
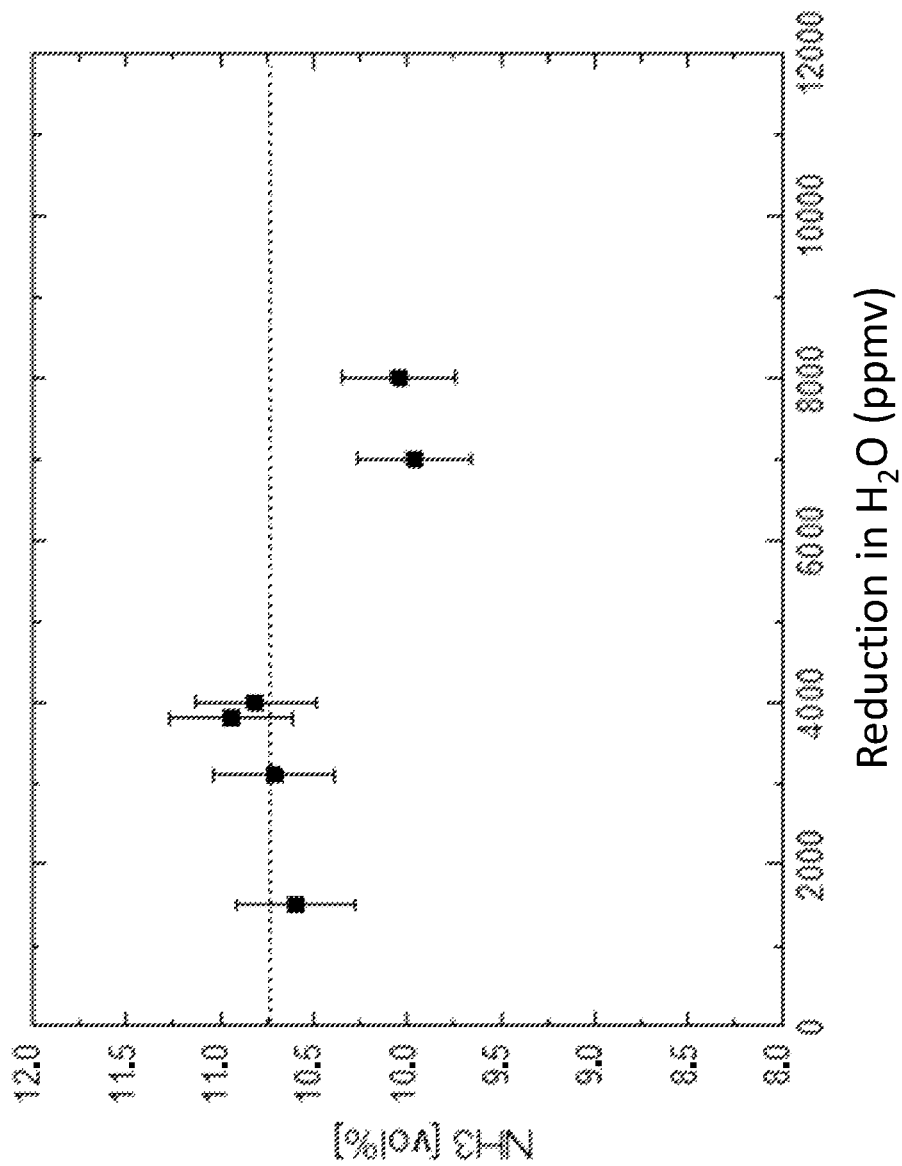

FIG. 5 shows the experimentally determined catalytic activity of six different catalysts based on wüstite, which were exposed during the reduction to different water contents of under 2000 ppmv to 8000 ppmv. It is clearly apparent that the catalytic activity drops by about 5% to 10% as the water content goes up, especially beyond a limiting value of about 4000 ppmv.

Figure 6:
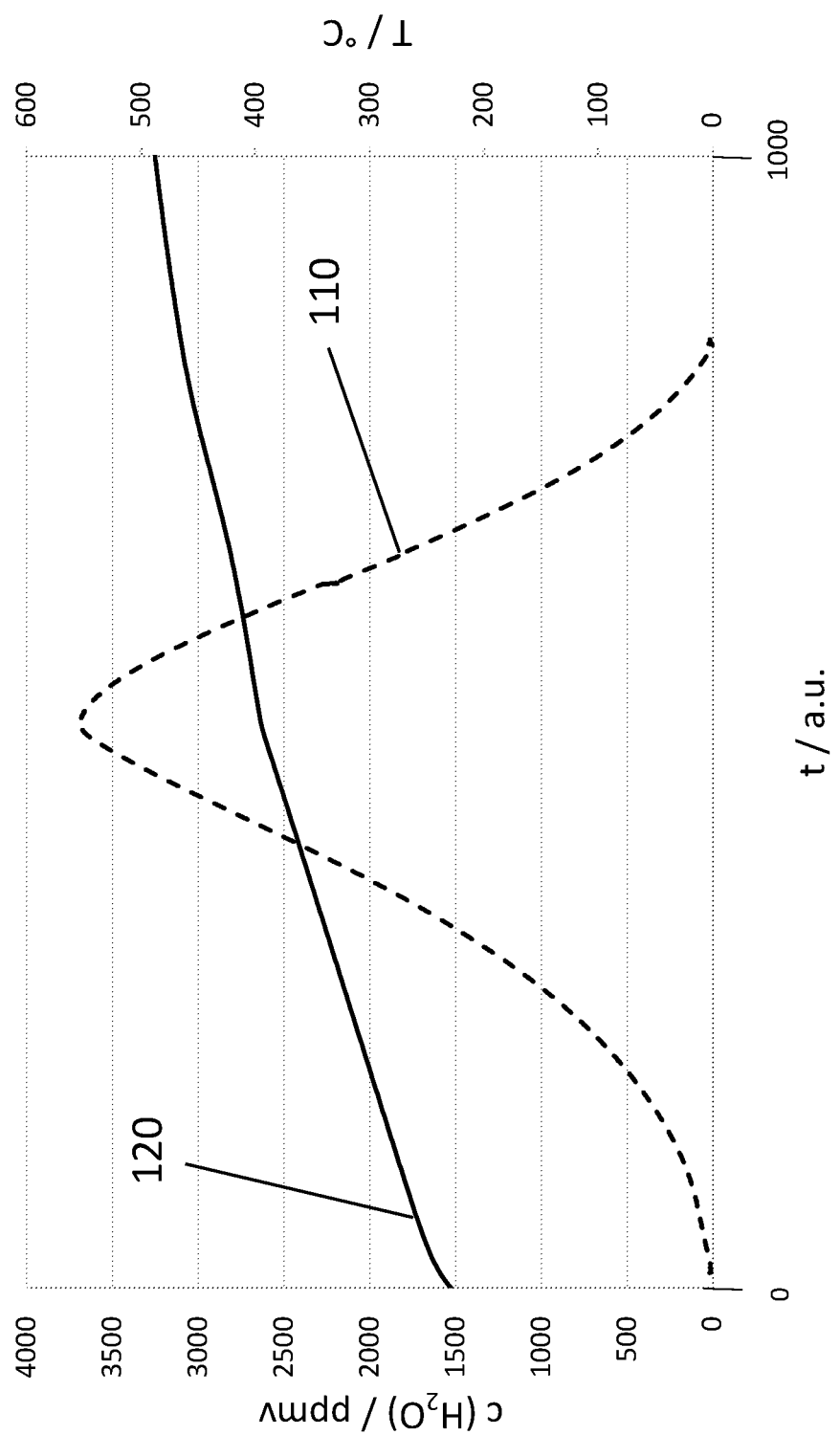
FIG. 6 shows a diagram relating to the measurement of the water content during the reduction of iron oxides by means of NDIR.

FIG. 6 shows the course of the water concentration (curve denoted 110) in the gas phase at the reactor exit in ppmv, and the temperature profile (curve denoted 120), over a certain period t. The water concentration was measured by means of an NDIR sensor. Iron oxides based on wüstite were reduced at a pressure of 90 bar in a hydrogen-containing atmosphere at a flow rate of 1200 NL/h (NL=normal liter (volume at 1013.25 mbar and 0° C.)). It is clearly apparent that at the start of the reduction, the temperatures and the water content in the gas phase are still relatively low and the reduction rate rises as time goes on, owing to the increasing temperature, leading to a higher water content at the reactor exit. Eventually a maximum water content is reached, at which point the water content at the reactor exit drops again because of the decreasing reduction rate. It is clearly apparent that in the reduction of wüstites, water contents in the gas phase of more than 3000 ppmv or more than 3500 ppmv can be measured. Such high water contents can be effectively prevented by a process of the invention for activating iron oxides.

The invention is not limited by the description with reference to the working examples. The invention instead embraces every new feature and also every combination of features, including in particular every combination of features in the claims, even if that feature or that combination is not itself explicitly indicated in the claims or working examples.

The invention claimed is:

1. A process for activating catalysts and catalyst precursors for ammonia synthesis, comprising the process steps of:
   (A) performing a reduction of iron oxides using at least one reducing gas and by means of heating,
   (B) measuring a concentration of water formed in a gas phase during the reduction by means of non-dispersive infrared spectroscopy (NDIR), and
   (C) setting a flow rate of the at least one reducing gas and/or a heating rate as a function of the concentration of water formed.

2. The process as claimed in claim 1, wherein in process step (C) the concentration of water determined in process step (B) is compared with a mandated limiting value for water.

3. The process as claimed in claim 2, wherein in process step (C) at least one of the following substeps is carried out:
   (C1) the heating rate is increased if the concentration of water determined in process step (B) is below a range around the mandated limiting value, or
   (C2) the flow rate is increased and/or the heating rate is lowered if the concentration of water determined in process step (B) is above the range around the mandated limiting value, or
   (C3) the flow rate and/or the heating rate are retained if the concentration of water determined in process step (B) is within the range around the mandated limiting value.

4. The process as claimed in claim 3, wherein the range around the mandated limiting value is selected from the group of ranges consisting of: ±1000 ppmv.

5. The process as claimed in claim 3, wherein the range around the mandated limiting value is selected from the group of ranges consisting of: ±600 ppmv.

6. The process as claimed in claim 2, wherein the mandated limiting value is selected from a range between 3000 ppmv to 4000 ppmv.

7. The process as claimed in claim 1, wherein process steps (A), (B) and (C) are carried out continuously.

8. The process as claimed in claim 1, wherein the measurement of water formed during the reduction in process step (B) takes place in real time.

9. The process as claimed in claim 1, wherein in process step (B) the concentration of water formed during the reduction is measured in a wavelength range from 2.6 to 3 μm.

10. The process as claimed in claim 1, wherein in process step (A) the at least one reducing gas is a mixture comprising hydrogen and nitrogen and ammonia is formed during the reduction.

11. The process as claimed in claim 1, wherein in process step (B) an NDIR device is used to measure the concentration of water formed and wherein absorption bands of ammonia in a wavelength range from 2.6 μm to 3 μm are subtracted out by means of calibration.

12. The process as claimed in claim 1, wherein in process step (B) a concentration of ammonia formed in the course of the reduction is ascertained by means of NDIR.

13. The process as claimed in claim 1, wherein ammonia and/or water formed in the course of the reduction are condensed by means of a condenser.

14. The process as claimed in claim 13, wherein in process step (C) ammonia and water are present and are condensed as an aqueous ammonia solution, and the condenser is set to a temperature of at least 10 K over a freezing point of the aqueous ammonia solution.

15. The process as claimed in claim 1, wherein the iron oxides used are magnetite, wüstite, or a combination thereof.

16. The process as claimed in claim 15, wherein in process step (A) the iron oxides are wüstite and heating takes place to a temperature in the range from 370° C. to 400° C.

17. The process as claimed in claim 1, wherein process step (A) is set to a temperature in the range from 360° C. to 450° C.

18. The process as claimed in claim 1, wherein in process step (B) the at least one reducing gas is a mixture comprising hydrogen and nitrogen and an aqueous ammonia solution is condensed out during the reduction.

19. The process as claimed in claim 1, additionally comprising a process step (D), wherein the catalysts and/or catalyst precursors from process step (C) are exposed to an oxidizing gas to form a protective layer on the catalysts and/or catalyst precursors.

20. The process as claimed in claim 1, wherein the iron oxides used is wüstite.

* * * * *